United States Patent [19]

Hayashi et al.

[11] Patent Number: 4,687,522
[45] Date of Patent: Aug. 18, 1987

[54] METHOD FOR WASHING INNER SURFACE OF TUBULAR PERMEABLE MEMBRANE

[75] Inventors: Masahiko Hayashi; Hiroshi Iwahori, both of Osaka, Japan

[73] Assignee: Nitto Electric Industrial Co., Ltd., Osaka, Japan

[21] Appl. No.: 761,724

[22] Filed: Aug. 2, 1985

[30] Foreign Application Priority Data

Dec. 11, 1984 [JP] Japan ................................ 59-261193

[51] Int. Cl.⁴ ................................................ B08B 9/04
[52] U.S. Cl. ............................................ 134/8; 134/9; 134/22.1; 210/636
[58] Field of Search ................ 210/636; 134/8, 9, 22.1

[56] References Cited

U.S. PATENT DOCUMENTS

| | | | |
|---|---|---|---|
| 3,541,004 | 11/1970 | Cooper, IV et al. | 210/636 |
| 3,819,513 | 6/1974 | Ishii et al. | 210/636 |
| 3,825,443 | 7/1974 | Reilly | 134/8 |
| 4,312,679 | 1/1982 | Klein, Sr. | 134/8 |
| 4,375,413 | 3/1983 | Geel et al. | 210/636 |

Primary Examiner—Andrew H. Metz
Assistant Examiner—Sharon T. Cohen
Attorney, Agent, or Firm—Sughrue, Mion, Zinn, Macpeak, and Seas

[57] ABSTRACT

A method for washing an inner surface of a tubular permeable membrane which comprises:
a friction piece having a hardness of from about 10° to 30° measured according to JIS K6301, 5-2 attached to an end of an elastic rod-like support, and
operating the support to reciprocate the friction piece within the tubular permeable membrane to thereby act a rub-washing force of from about 0.1 to 1.0 kg/cm² between the inner surface of the tubular permeable membrane and the friction piece so as to remove contaminants adhered to the inner surface of the tubular permeable membrane.

9 Claims, 2 Drawing Figures

METHOD FOR WASHING INNER SURFACE OF TUBULAR PERMEABLE MEMBRANE

FIELD OF THE INVENTION

The present invention relates to a method for washing an inner surface of a tubular permeable membrane

BACKGROUND OF THE INVENTION

In the case of membrane separation process using a membrane such as an ultrafiltration membrane or a reverse osmosis membrane, solid materials in a raw liquid adhere to the inner surface of the membrane with the lapse of time and a so-called membrane contamination proceeds. As a result, deterioration in permeation performance of the membrane is unavoidable. Therefore, the membrane must be periodically washed to recover the permeation performance of the membrane.

The efficiency of washing can be evaluated by the degree of recovery of the permeation performance of the membrane, viz., the ratio of the amount of the membrane permeated liquid after washing the membrane to the initial amount of the membrane permeated liquid. Any criterion has not been conventionally established to determine the efficiency of washing and this efficiency factor is appropriately determined in accordance with various conditions such as the manner of washing, the degree of contamination of the membrane, the period of washing, etc.

The present inventors have found that there is the relationship such that the higher the efficiency of washing is, the lower the rate of membrane contamination becomes, between the efficiency of washing (i.e., the degree of the amount of contaminants adhered to the surface of the membrane after washing) and the rate of membrane contamination after washing (i.e., reduction in liquid permeation rate with the lapse of time). For example, referring to FIG. 2, curves A, B and C each shows the state of reduction in liquid permeation rate after washing when the liquid permeation rate decreases to 9.462 lpm (liter per minute; hereinafter the same) in an ultrafiltration apparatus using a tubular permeable membrane having the initial amount of the membrane permeated liquid of 30.28 lpm. That is, the curves A, B, and C show the states after washing the membrane so as to obtain the liquid permeation rate of 21.763 lpm (the degree of recovery: about 72%), after washing the membrane so as to obtain the liquid permeation rate of 24.60 Zpm (the degree of recovery: about 81%), and after washing the membrane so as to obtain the liquid permeation rate of 28.387 lpm (the degree of recovery: about 94%), respectively. It is apparent from the results that slight increase in the efficiency of washing greatly contributes to preventing the liquid permeation rate from lowering. For example, on comparison between the curves B and C shown in FIG. 2, in the case of the curve B, the degree of recovery is 81% and the degree of reduction in the liquid permeation rate after washing (30 days after) is 42% (the ratio of the lowered liquid permeation rate after 30 days to the liquid permeation rate immediately after washing). On the other hand, in the case of the curve C, the degree of recovery is 94% and the degree of reduction in the liquid permeation rate after washing is 13%. Therefore, the degree of reduction in the liquid permeation rate can be decreased about 30% by only increasing the degree of recovery by 13%.

As described above, in the membrane washing, the more the degree of recovery in the permeation performance of the membrane is increased, the more the degree of membrane contamination after washing can be decreased, so that it is possible to make the intervals of washing of the membrane longer to thereby minimize the frequency of washing. This is convenient in the maintenance of membrane.

A method in which a chemical agent is filled in a tubular membrane to dissolve contaminants adhered to the membrane is conventionally known as a method for washing a tubular permeable membrane. In this method, however, it is extremely difficult to reach the above-described degree of recovery near 100%. Therefore, a further method is known in which after washing the membrane with the chemical agent, a washing ball such as sponge ball or the like is introduced into the tubular permeable membrane to run it within the tubular permeable membrane by a fluid back pressure. In this method, contaminants adhered to the surface of the membrane are removed by shearing force (hereinafter referred to as "rub-washing force") caused between the washing ball and the membrane surface.

The rub-washing force & is expressed as follows:

$$\tau = A_1(P_1 - P_2)/2A_2$$

wherein $P_1$ and $P_2$ represent upstream and downstream fluid pressures acting onto the washing ball, respectively, and $A_1$ and $A_2$ represent contacting areas between the ball and the fluid and between the ball and the membrane, respectively. In order to increase the rub-washing force, the fluid pressure must be increased. However, a limit exists to increase the pressure $P_1$ in view of the pressure resistance of the membrane. Further, there is an inconvenience that if the pressure $P_1$ is increased, the flow rate correspondingly increases to thereby cause a difficulty in liquid operation. Thus, a limit exists to increase the rub-washing force. In this case, it is also difficult to reach the above-described degree of recovery near 100%.

Thus, it is difficult in the conventional method for washing a surface of a tubular permeable membrane to reach the degree of recovery of the permeation performance of the membrane near 100% and the practical upper limit is at most 80%.

If the degree of recovery can be increased even several %, the lowering of the liquid permeation rate with the lapse of time after washing or the progress of membrane contamination can be effectively prevented, as described above. In the prior art methods, however, such a technical advantage has not been recognized.

The present inventors have recognized such a technical advantage and made various investigations on a washing method which is capable of reaching the degree of recovery of the permeation performance of a membrane at least 90%, preferably near 100%.

A method in which in the above-described washing ball system, a pushing rod to directly transmit external force to a washing ball is used instead of fluid pressure as an external force which is a washing force source is known as such a method, and this method is known as a washing means in the field of elongated or deep vessels.

If this washing means can be utilized to wash a tubular permeable membrane, it will be possible to perform washing in which the permeation performance of the membrane can be substantially recovered completely.

As a result, the progress of membrane contamination after washing can be remarkably improved, and the total effect obtained by the combination with the tubular permeable membranes can be unexpectedly raised.

SUMMARY OF THE INVENTION

Accordingly, an object of this invention is to provide a method for washing an inner surface of a tubular permeable membrane which can remove dontaminants adhered to the membrane safely without injuring the membrane by using a specific washing means The method for washing an inner surface of a tubular permeable membrane according to this invention comprises:

preparing a friction piece having a hardness of from about 10° to 30° measured using a spring type hardness tester according to JIS K6301, 5-2 (hereinafter the same) attached to an end of an elastic rod-like support; and operating the support to reciprocate the friction piece within the tubular permeable membrane to thereby act a rub-washing force of from about 0.1 to 1.0 kg/cm$^2$ between the inner surface of the tubular permeable membrane and the friction piece so as to remove contaminants adhered to the inner surface of the tubular permeable membrane.

DETAILED DESCRIPTION OF THE INVENTION

This invention is explained by reference to the accompanying drawings.

Figure 1:
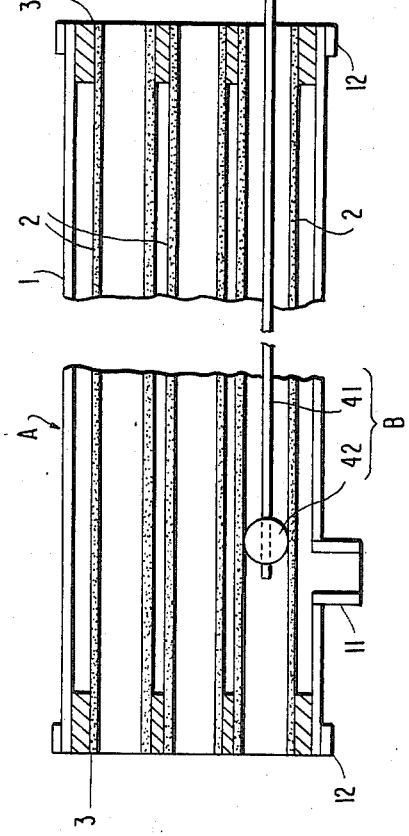
FIG. 1 is a cross-sectional view illustrating an embodiment of the method for washing an inner surface of a tubular permeable membrane according to the present invention.

In FIG. 1, A is a membrane module and comprises an outer cylinder 1; a plurality of tubular permeable membrane 2 which are inserted to the outer cylinder and are sealed at both ends to the outer cylinder with a sealing material 3 (e.g., a thermosetting resin); an inlet 11 for a permeating liquid provided on the outer cylinder; and a screw 12 for joint.

B is a washing device and comprises an elastic rod-like support 41 and a friction piece 42 attached to an end of the support.

The washing of the tubular permeable membrane according to this invention is conducted in the following manners.

A chemical agent is filled in a tubular permeable membrane in the state that the membrane module is connected to a pipe arrangement to thereby perform washing with the chemical agent, the membrane module is separated from the pipe arrangement, the friction piece of the above-described washing device is inserted into each of the tubular permeable membranes, and the friction piece is reciprocated within the membrane by operating an elastic rod-like support. In this case, the rub-washing force acts between the surface of the membrane and the friction piece, so that contaminants adhered to the inner surface of the membrane are removed as the friction piece moves by the rub-washing force, because the contaminants have swollen due to the washing with the chemical agent. Depending on the kind of contaminants adhered, the washing with the chemical agent may be omitted.

The rub-washing force must be within a range from about 0.1 to 1.0 kg/cm$^2$, preferably from 0.3 to 0.7 kg/cm$^2$. If the force is larger than 1.0 kg/cm$^2$, the membranes tend to be damaged, and if the force is smaller than 0.1 kg/cm$^2$, it is difficult to remove the contaminants.

The moving speed of the friction piece is generally from about 0.2 to 2.0 m/sec, preferably from 0.5 to 1.5 m/sec.

It is desirable for the friction piece to have the hardness of from about 10° to 30°, preferably from 12° to 18°, so as to prevent the membrane damage. Materials which can be used as the friction piece are sponge, foam, etc. made of polyvinyl formal rubber, natural rubber, butyl rubber, urethane rubber, acrylic rubber, etc. The shape of the friction piece is usually a spherical foam.

In order to obtain the rub-washing force as described above by using such a friction piece, the outer diameter of the friction piece is from about 1.1 to 1.4 times the inner diameter of the tubular membrane.

In the above-described case, if the contact area between the friction piece and the inner surface of the membrane is represented by S, the external force in equilibrium with the maximum rub-washing force $\tau_{max}$ is $S \cdot \tau_{max}$. Therefore, if the rod-like support can transmit an external force without bending even if the external force is larger than $S \cdot \tau_{max}$, excessive rub-washing force may act to arise a risk of damage in the membrane. Therefore, it is necessary to use a rod-like support which has proper stiffness such that the rod may elastically bend by external force substantially equal to the above-described external force $S \cdot \tau_{max}$. In general, a plastic rod which is made of nylon, polypropylene, polyethylene, or the like, or a spring wire, having an outer diameter of from about 3.0 to 6.0 mm is used as the support. The elastic modulus of the rod-like support is usually from about $3 \times 10^3$ to $10 \times 10^3$ kg/cm$^3$.

It is necessary for the rod-like support to have its length slightly larger than that of the membrane module. The length of the module is generally from about 2.5 to 3.0 m and it is desirable for the length of the support to be about 3.5 m.

This invention will now be explained in detail by reference to the following Examples and Comparative Examples.

EXAMPLE 1

A membrane module used was an ultrafiltration apparatus having tubular permeable membranes each having an inner diameter of 11.5 mm and having a total membrane area of 65.5 m$^2$. A washing device used was a device comprising a nylon rod having an outer diameter of 4.5 mm and a length of 3.5 m and a polyvinyl formal rubber sponge ball having an outer diameter of 14.5 mm and a hardness (JIS K6301, 5-2) of 15° attached to an end thereof.

The membrane module was used to control a paint in an electrodeposition coating line. The initial liquid permeation amount was 30.28 lpm. After 0.5 year, the liquid permeation amount was decreased to 9.462 lpm and the weight of contaminants adhered per unit area of membrane reached 11.4 g/m$^2$. The tubular membranes were washed with a chemical agent (a mixture of organic acid, cellosolve, and a nonionic surface active agent) and then a polyvinyl formal rubber sponge ball was reciprocated against each of the tubular permeable membranes at an average speed of 1 m/sec. In this case, the rub-washing force was 0.4 kg/m².

Immediately after washing with the chemical agent, the weight of contaminants was 6.9 g/m², the liquid permeation amount was 21,763 lpm, and the degree of recovery was about 72%. Further, immediately after the reciprocation of the polyvinyl formal rubber sponge ball, the amount of contaminants adhered was very slight and it was impossible to measure the weight thereof. The liquid permeation amount was 28.387 lpm, and the degree of recovery was about 94%.

COMPARATIVE EXAMPLE 1

After washing with the chemical agent as in Example 1 above, several polyvinyl formal rubber sponge balls having an outer diameter of 14.5 mm were introduced inside the rubular ultrafiltration module and were reciprocated by reversing the direction of fluid stream forward and backward as the well-known feed flaw-type sponge ball cleaning. Immediately after reciprocating the ball, the weight of contaminants on the membrane was 3.0 g/m², the liquid permeation amount was 24.60 lpm, and the degree of recovery was about 81%.

COMPARATIVE EXAMPLE 2

Only washing with the chemical agent was performed in Example 1.

Figure 2:
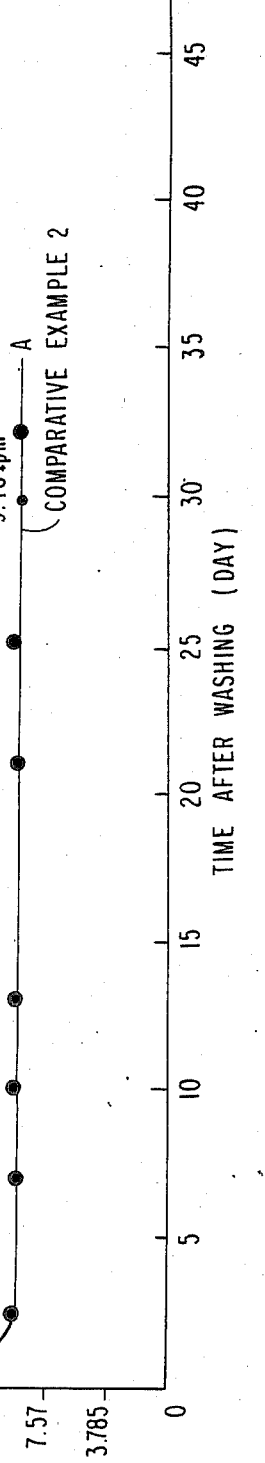
FIG. 2 is a graph showing the comparison between the rate of membrane contamination after washing in the example of the present invention and the rate of membrane contamination after washing in comparative examples.

Lowering of the liquid permeation amount with the lapse of time after washing was measured in Example 1 and Comparative Examples 1 and 2. The results obtained are shown in FIG. 2, wherein Curve A shows the results obtained in Example 1, and Curves B and C show the results obtained in Comparative Examples 1 and 2, respectively.

As is apparent from those results, progress of membrane contamination after washing can be extremely suppressed by the method for washing tubular permeable membranes according to this invention, as compared with the conventional membrane washing method. Therefore, the number of washing can be reduced and maintenance of the membrane module is easy.

EXAMPLE 2

A membrane module used was an ultrafiltration apparatus having tubular permeable membranes each having an internal diameter of 11.5 mm and having a total membrane area of 60.0 m². A washing device used was the same as used in Example 1.

The membrane module was used to treat waste water of water soluble cutting oil. The initial liquid permeation amount was 43 lpm. After use for 3 months, the permeation amount was decreased to 24 lpm. A polyvinyl formal rubber sponge ball was reciprocated by operating the nylon rod at a speed of 1 m/sec without conducting washing with a chemical agent. The liquid permeation amount immediately after reciprocating the ball was 39 lpm, and the degree of recovery was about 91%. When the permeation amount was measured after use for 30 days, the liquid permeation rate was 33 lpm and the degree of reduction in the liquid permeation amount was only 16% which was comparable to the value of about 13% in Example 1 (24.60% lpm with the lapse of 30 days after recovering to 28.387 lpm) and remarkably superior to the value of about 42% in Comparative Example 1 (14.19 lpm with the lapse of 30 days after recovering to 24.60 lpm).

Thus, in the washing method according to the present invention, the effect of remarkable suppression of membrane contaminants after washing can be expected even if the washing with a chemical agent is not conducted in advance, depending on the kind of contaminants.

While the invention has been described in detail and with reference to specific embodiments thereof, it will be apparent to one skilled in the art that various changes and modification can be made therein without departing from the spirit and scope thereof.

What is claimed is:

1. A method for washing an inner surface of a tubular permeable membrane which comprises:
   (a) inserting a washing device comprising an elastic rod-like support and a friction piece, attached to an end of the support, having a hardness of from about 10° to 30° measured according to JIS K-6301, 5-2 within the tubular permeable membrane so that the friction piece contacts with the inner surface of the membrane; and
   (b) operating the support to reciprocate the friction piece within the tubular permeable membrane to thereby act a rubwashing force of from about 0.1 to 1.0 kg/cm² due to the contact between the inner suface of the tubular permeable membrane and the friction piece so as to remove contaminants adhered to the inner surface of the tubular permeable membrane, wherein the moving speed of the friction piece is from about 0.2 to 2.0 m/sec.

2. A method as in claim 1, wherein a degree of recovery in the permeation performance of the membrane after washing is at least about 90%.

3. A method as in claim 1, wherein the support has an elastic modulus of from about $3 \times 10^3$ to $10 \times 10^3$ kg/cm³.

4. A method as in claim 1, wherein a washing with a chemical agent is conducted to swell contaminants and the friction piece is then reciprocated within the membrane.

5. A method as in claim 1, wherein an outer diameter of the friction piece is from about 1.1 to 1.4 times the inner diameter of the tubular membrane.

6. A method as in claim 1, wherein the friction piece is a sponge ball made of polyvinyl formal rubber.

7. A method as in claim 1, wherein the hardness of the friction piece is from 12° to 18°.

8. A method as in claim 1, wherein the rub-washing force is from 0.3 to 0.7 kg/cm².

9. A method as in claim 1, wherein the moving speed of the friction piece is from 0.5 to 1.5 m/sec.

* * * * *